US010652795B2

(12) United States Patent
Chandrashekar et al.

(10) Patent No.: US 10,652,795 B2
(45) Date of Patent: May 12, 2020

(54) SMALL CELL MOBILITY WITH DUAL/MULTI CONNECTIVITY

(71) Applicant: NOKIA SOLUTIONS AND NETWORKS OY, Espoo (FI)

(72) Inventors: Subramanya Chandrashekar, Bangalore (IN); Hans Thomas Hoehne, Helsinki (FI); Devaki Chandramouli, Plano, TX (US); Cinzia Sartori, Pullach (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 9 days.

(21) Appl. No.: 15/567,684

(22) PCT Filed: Apr. 12, 2016

(86) PCT No.: PCT/EP2016/057959
§ 371 (c)(1),
(2) Date: Oct. 19, 2017

(87) PCT Pub. No.: WO2016/169801
PCT Pub. Date: Oct. 27, 2016

(65) Prior Publication Data
US 2018/0092010 A1 Mar. 29, 2018

(30) Foreign Application Priority Data
Apr. 21, 2015 (IN) .......................... 1110/DEL/2015

(51) Int. Cl.
*H04W 36/14* (2009.01)
*H04L 12/24* (2006.01)
*H04W 48/16* (2009.01)
*H04W 48/18* (2009.01)
*H04W 36/00* (2009.01)
*H04W 24/10* (2009.01)
*H04W 88/06* (2009.01)

(52) U.S. Cl.
CPC ......... *H04W 36/14* (2013.01); *H04L 41/0668* (2013.01); *H04L 41/0672* (2013.01);
(Continued)

(58) Field of Classification Search
CPC . H04W 36/14; H04W 36/0033; H04W 48/16; H04W 48/18; H04L 41/0668; H04L 41/0672
See application file for complete search history.

(56) References Cited

U.S. PATENT DOCUMENTS

2012/0177002 A1* 7/2012 Faucher ................ H04W 36/02
370/331
2012/0224578 A1* 9/2012 Mihaly ............... H04L 12/4633
370/392

(Continued)

OTHER PUBLICATIONS

International Search Report & Written Opinion dated Jun. 10, 2016 corresponding to International Patent Application No. PCT/EP2016/057959.

(Continued)

*Primary Examiner* — Kodzovi Acolatse
*Assistant Examiner* — Jay L Vogel
(74) *Attorney, Agent, or Firm* — Squire Patton Boggs (US) LLP

(57) ABSTRACT

There are provided measures for improvements in small cell mobility with dual/multi connectivity. Such measures exemplarily comprise terminating at least one control plane signaling connection from said terminal for said at least first network access entity and second network access entity, maintaining a terminal related access stratum context commonly for radio accesses of said terminal to said at least first network access entity and second network access entity, and initiating switching of said radio access of said terminal from said first network access entity to said second network access entity for user plane data transfer with said control plane signaling connection for said second network access entity being applied unchanged, thereby providing, in a control plane for a terminal, connection management for at least a first network access entity and a second network (Continued)

access entity, wherein said at least first network access entity and second network access entity providing radio access for user plane data transfer for said terminal, wherein said terminal being capable of having radio access to said at least first network access entity and second network access entity for user plane data transfer.

19 Claims, 10 Drawing Sheets

(52) U.S. Cl.
CPC ....... *H04W 36/0033* (2013.01); *H04W 48/16* (2013.01); *H04W 48/18* (2013.01); *H04L 41/0813* (2013.01); *H04W 24/10* (2013.01); *H04W 36/0069* (2018.08); *H04W 88/06* (2013.01)

(56) References Cited

U.S. PATENT DOCUMENTS

| | | | | |
|---|---|---|---|---|
| 2013/0235844 | A1* | 9/2013 | Ge | H04W 36/00 370/331 |
| 2015/0055623 | A1* | 2/2015 | Li | H04W 40/04 370/331 |
| 2015/0223119 | A1* | 8/2015 | Xu | H04W 36/0066 455/436 |
| 2016/0205578 | A1* | 7/2016 | Lee | H04W 24/10 455/442 |
| 2016/0242080 | A1* | 8/2016 | Vikberg | H04W 36/0027 |
| 2017/0055189 | A1* | 2/2017 | Xu | H04W 36/00 |

OTHER PUBLICATIONS

Huawei, "TP for Mobility Anchor," 3GPP DRAFT; R3-150578, 3GPP TSG-RAN3 Meeting #87bis, Tenerife—Santa Cruz, Spain, Apr. 20-24, 2015, Apr. 11, 2015, XP050937196.

ZTE, "Consideration of potential issues arise from the deployment of dense small cell," 3GPP DRAFT; R3-150630, 3GPP TSG-RAN WG3 Meeting #87bis, Santa Cruz, Spain Apr. 20-24, 2015, Apr. 11, 2015, XP 050937247.

3GPP TS 23.401 V13.0.0 (Sep. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Sep. 2014.

* cited by examiner

SMALL CELL MOBILITY WITH DUAL/MULTI CONNECTIVITY

FIELD

The present invention relates to improvements in small cell mobility with dual/multi connectivity. More specifically, the present invention exemplarily relates to measures (including methods, apparatuses and computer program products) for realizing improvements in small cell mobility with dual/multi connectivity.

BACKGROUND

Mobile data transmission and data services are constantly making progress. With the increasing penetration of such services, different access networks may coexist in parallel. Typically, in relation to mobile communication systems, an access network is represented by a radio access network (RAN) which is based on a certain radio access technology (RAT). While "radio" is a typical medium for mobile communication, other media are intended to be also covered by the principles taught herein. For example, Infrared or Bluetooth® or other media and/or wavelengths of radio are possible to represent the access network. As there has to be a (downward) compatibility between newly developed and pre-existing access networks and/or access networks technologies, terminals often have a capability to communicate based on one or more access networks technologies. Also, when a new access network is developed and launched, the network is not immediately available in the entire country of deployment, but its coverage may be limited to certain areas and be successively expanded over time.

The present invention will herein below be explained with reference to Long Term Evolution (LTE) as one example of a access network or radio access technology (LTE is also known as fourth generation 4G mobile communication) and its successor or improvement which is currently being developed and referred to as 5G (fifth generation mobile communication) as a further access network or radio access technology, but also with reference to predecessors thereof. Though, principles set out herein below are applicable to other scenarios than explained, too. Typically, a mobile communication network consists of an access network establishing the physical transport of data (payload (user) data and control data) and a core network establishing the control functionality for the entire network and the interoperability of the network with other networks, e.g. via gateways. References to specific network entities or nodes and their names are intended as mere example only. Other network node names may apply in different scenarios while still accomplishing the same functionality. Also, the same functionality may be moved to another network entity. Therefore, the principles as taught herein below are not to be understood as being limited to the specific scenario referred to for explanation purposes.

For example, the Evolved Packet System (EPS) is the successor of General Packet Radio System (GPRS). It provides a new radio interface and new packet core network functions for broadband wireless data access. Such EPS core network functions are the Mobility Management Entity (MME), Packet Data Network Gateway (PDN-GW, P-GW) and Serving Gateway (S-GW).

FIG. 1 illustrates the Evolved Packet Core architecture as introduced and defined by 3GPP TS 23.401 v13.0.0.

The entities involved and interfaces there between are defined in that document and reference is made thereto for further details. Acronyms used in the Figure are listed at the end of this specification.

A common packet domain Core Network (CN) is used for both RANs, the Global System for Mobile Communication (GSM) Enhanced Radio Access Network (GERAN) and the Universal Terrestrial Radio Access Network (UTRAN). This common CN provides GPRS services.

It is envisioned that a 5G system will provide the new mobile, low-latency and ultra-reliable services, and some services like Vehicle-To-X (V2X) will be more efficiently provided by 5G system.

A reference to 5G architecture that is envisioned is depicted in FIG. 2.

Acronyms used in the Figure are listed at the end of this specification.

In brief, a terminal such as a 5G NT (network terminal or user equipment) is provided with an internet protocol IP user network interface (IP UNI) and an Ethernet user network interface (ETH UNI) and may communicate via a Uu* interface with an Access Point (AP) in the mobile access network. The entire network has a mobile access part, a networks service part and an application part. Within each of those parts, there exists a control plane and a user (data) plane. The AP is located in both planes.

It is evident that interworking of 5G with the existing RAT technologies like LTE is needed FIG. 3 schematically illustrates possible inter RAT architecture following traditional concepts applied to a scenario with LTE and 5G mobile communication system.

Here, a terminal (user equipment, UE) capable of accessing to LTE network and 5G network is connected to a 5GAP being an access point of a 5G mobile communication system and to an evolved NodeB (eNB) being an access point of a 3.9/4G mobile communication system (LTE). The control plane (dotted lines) as well as the user plane (solid lines) of both mobile communication systems is handled by a control plane mobile gateway (cMGW) and a user plane gateway (uGW), respectively, via respective interfaces (S1*, S1-U, S1-C).

$3^{rd}$ Generation Partnership Project (3GPP) switched from the distributed architecture of wideband code division multiple access (WCDMA) to a flat architecture of LTE which allowed a reduction of the number of hardware boxes, a reduction of intermediate nodes, and a minimization of Access Stratum (AS) signaling during mobility.

The introduction of small cells with limited coverage compared to a large macro cell results in that the frequency of mobility events involving change of small cell base stations increases. That is, AS mobility events causes excessive signaling on the network, which consumes additional processing, additional signaling, and may cause service interruption during the mobility events.

However, it is expected that 5G is to have multiple flavors of small cells in centimeter wave and millimeter wave. Accordingly, the mentioned problem resulting from small cells is likely to be considerably increased.

Hence, there is a need to reduce signaling and to minimize service disruption during mobility events.

In particular, there is a need to provide for improvements in small cell mobility with dual/multi connectivity.

In this regard it is noted that dual connectivity means that a terminal moves between two radio access coverage areas having different RATs (here LTE and 5G), establishing simultaneous connections with both networks before seamlessly handing over.

Further, multi connectivity means that a terminal connects to two base stations of a RAT (here 5G) simultaneously, improving bit rate performance through multiple downlink streams, as well as signal strength and resilience.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method for providing, in a control plane for a terminal, connection management for at least a first network access entity and a second network access entity, wherein said at least first network access entity and second network access entity providing radio access for user plane data transfer for said terminal, wherein said terminal being capable of having radio access to said at least first network access entity and second network access entity for user plane data transfer, the method comprising terminating at least one control plane signaling connection from said terminal for said at least first network access entity and second network access entity, maintaining a terminal related access stratum context commonly for radio accesses of said terminal to said at least first network access entity and second network access entity, and initiating switching of said radio access of said terminal from said first network access entity to said second network access entity for user plane data transfer with said control plane signaling connection for said second network access entity being applied unchanged.

According to an exemplary aspect of the present invention, there is provided an apparatus for providing, in a control plane for a terminal, connection management for at least a first network access entity and a second network access entity, wherein said at least first network access entity and second network access entity providing radio access for user plane data transfer for said terminal, wherein said terminal being capable of having radio access to said at least first network access entity and second network access entity for user plane data transfer, the apparatus comprising at least one processor, at least one memory including computer program code, and at least one interface configured for communication with at least another apparatus, the at least one processor, with the at least one memory and the computer program code, being configured to cause the apparatus to perform terminating at least one control plane signaling connection from said terminal for said at least first network access entity and second network access entity, maintaining a terminal related access stratum context commonly for radio accesses of said terminal to said at least first network access entity and second network access entity, and initiating switching of said radio access of said terminal from said first network access entity to said second network access entity for user plane data transfer with said control plane signaling connection for said second network access entity being applied unchanged.

According to an exemplary aspect of the present invention, there is provided an apparatus for providing, in a control plane for a terminal, connection management for at least a first network access entity and a second network access entity, wherein said at least first network access entity and second network access entity providing radio access for user plane data transfer for said terminal, wherein said terminal being capable of having radio access to said at least first network access entity and second network access entity for user plane data transfer, the apparatus comprising terminating means configured to terminate at least one control plane signaling connection from said terminal for said at least first network access entity and second network access entity, maintaining means configured to maintain a terminal related access stratum context commonly for radio accesses of said terminal to said at least first network access entity and second network access entity, and initiating means configured to initiate switching of said radio access of said terminal from said first network access entity to said second network access entity for user plane data transfer with said control plane signaling connection for said second network access entity being applied unchanged.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one or more of the above aspects enables an efficient improvement on dual/multi connectivity, thereby optimizing intra- and inter-RAT mobility in that signaling during mobility events is reduced, and/or service disruption during handovers is minimized. These effects are achieved for both, intra-small cell and small cell-to-macro cell mobility. Thereby, at least part of the problems and drawbacks identified in relation to the prior art are solved.

By way of exemplary embodiments of the present invention, there is provided improvements in small cell mobility with dual/multi connectivity. More specifically, by way of exemplary embodiments of the present invention, there are provided measures and mechanisms for realizing improvements in small cell mobility with dual/multi connectivity.

Thus, improvement is achieved by methods, apparatuses and computer program products enabling/realizing improvements in small cell mobility with dual/multi connectivity.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

As mentioned before, it is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) improvements in small cell mobility with dual/multi connectivity.

Figure 1:
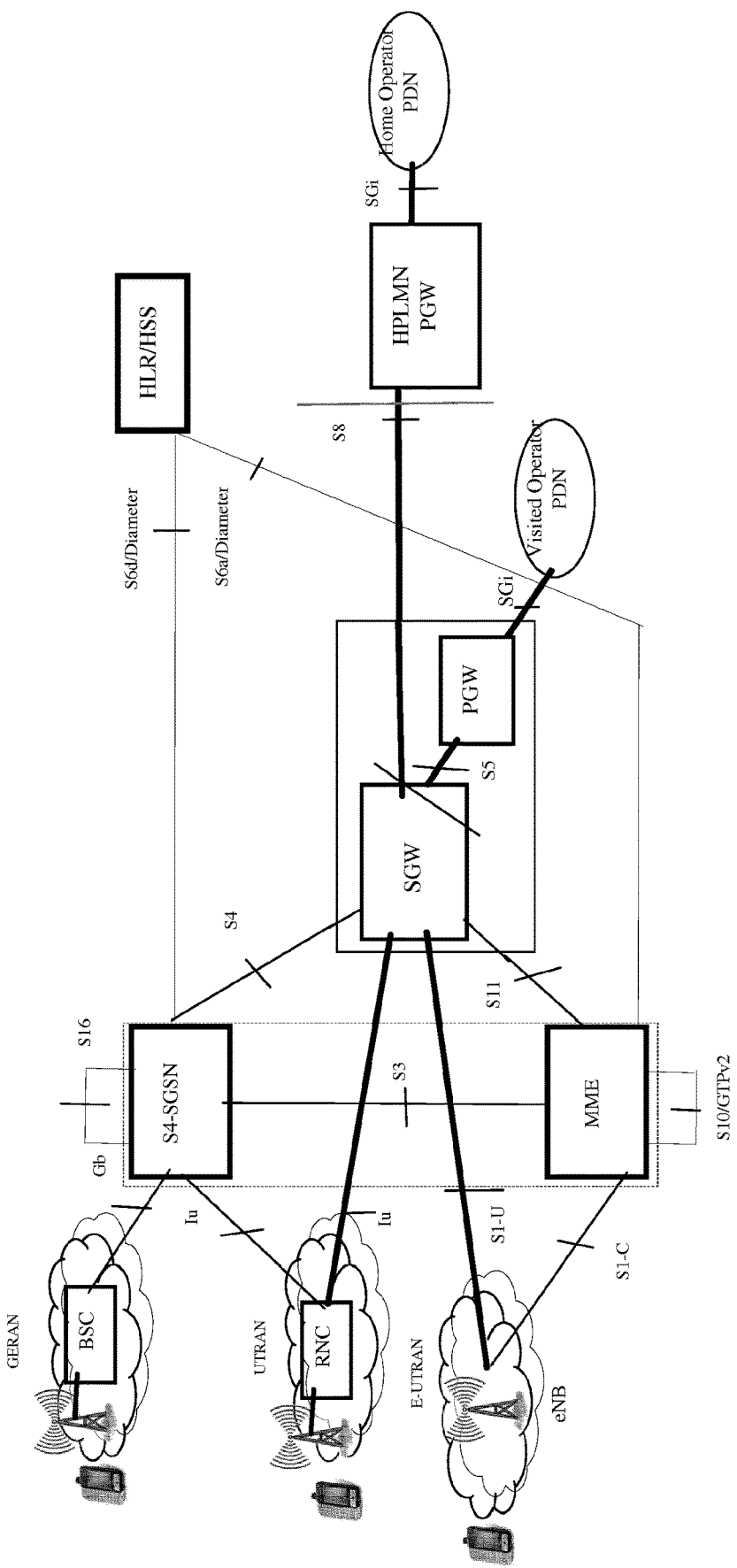
FIG. 1 illustrates a commonly known architecture of the EPS.
Figure 2:
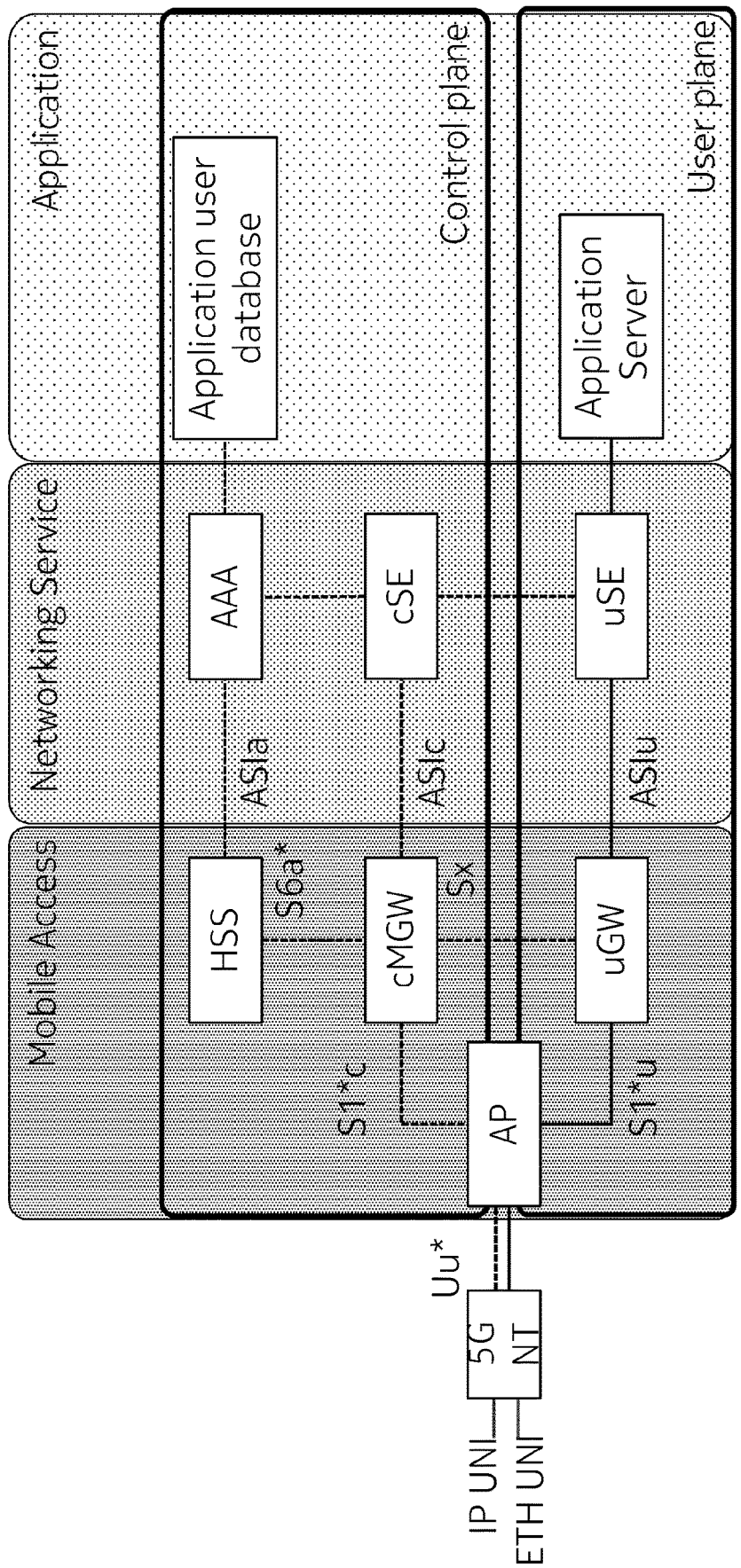
FIG. 2 illustrates a reference architecture of a 5G network, FIG. 3 schematically illustrates possible inter RAT architecture following traditional concepts applied to a scenario with LTE and 5G mobile communication system, FIG. 4 schematically illustrates an inter RAT architecture for multi RAT interworking applied to a scenario with LTE and 5G mobile communication system, according to exemplary embodiments of the present invention.
Figure 3:
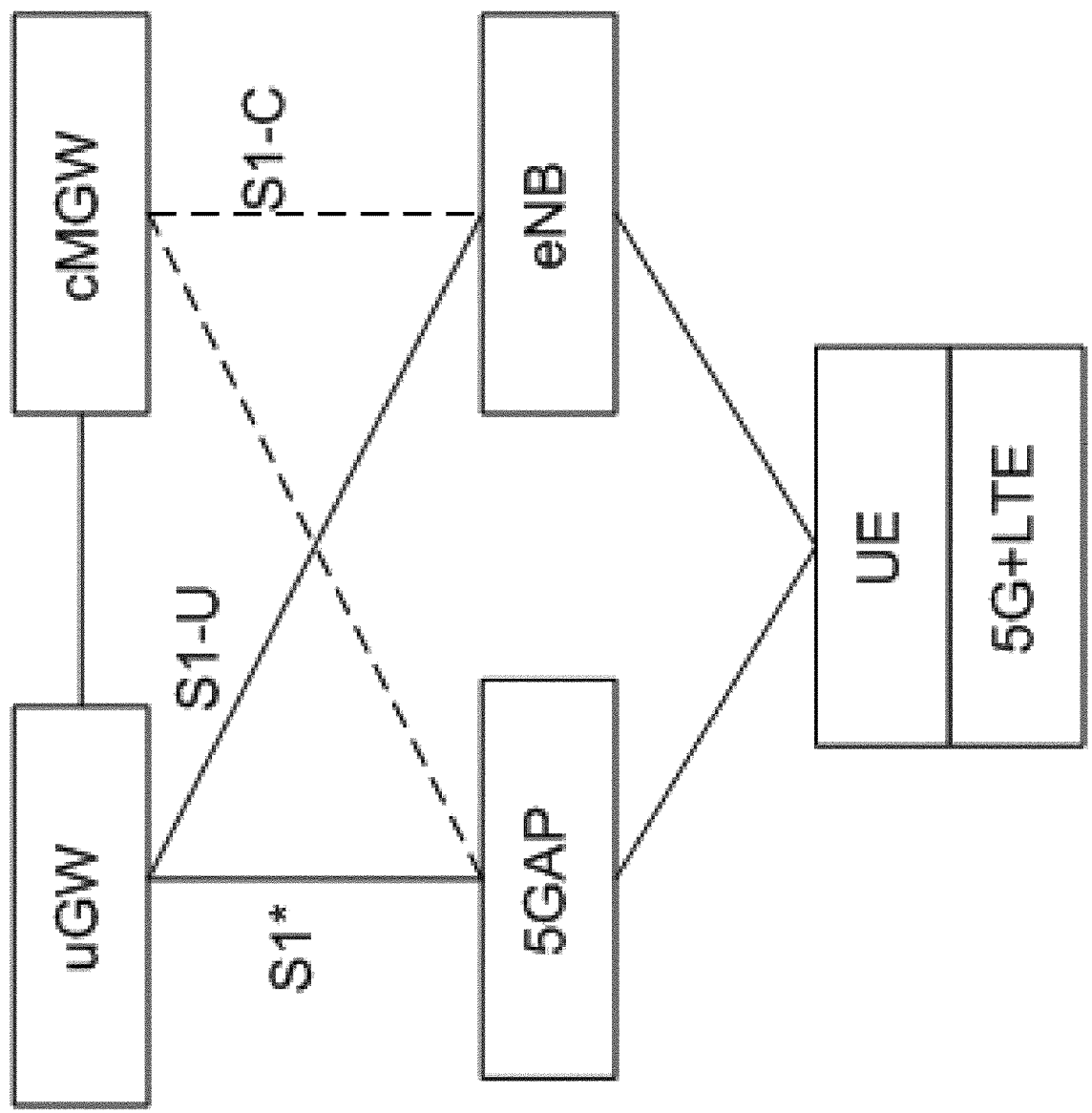
Figure 4:
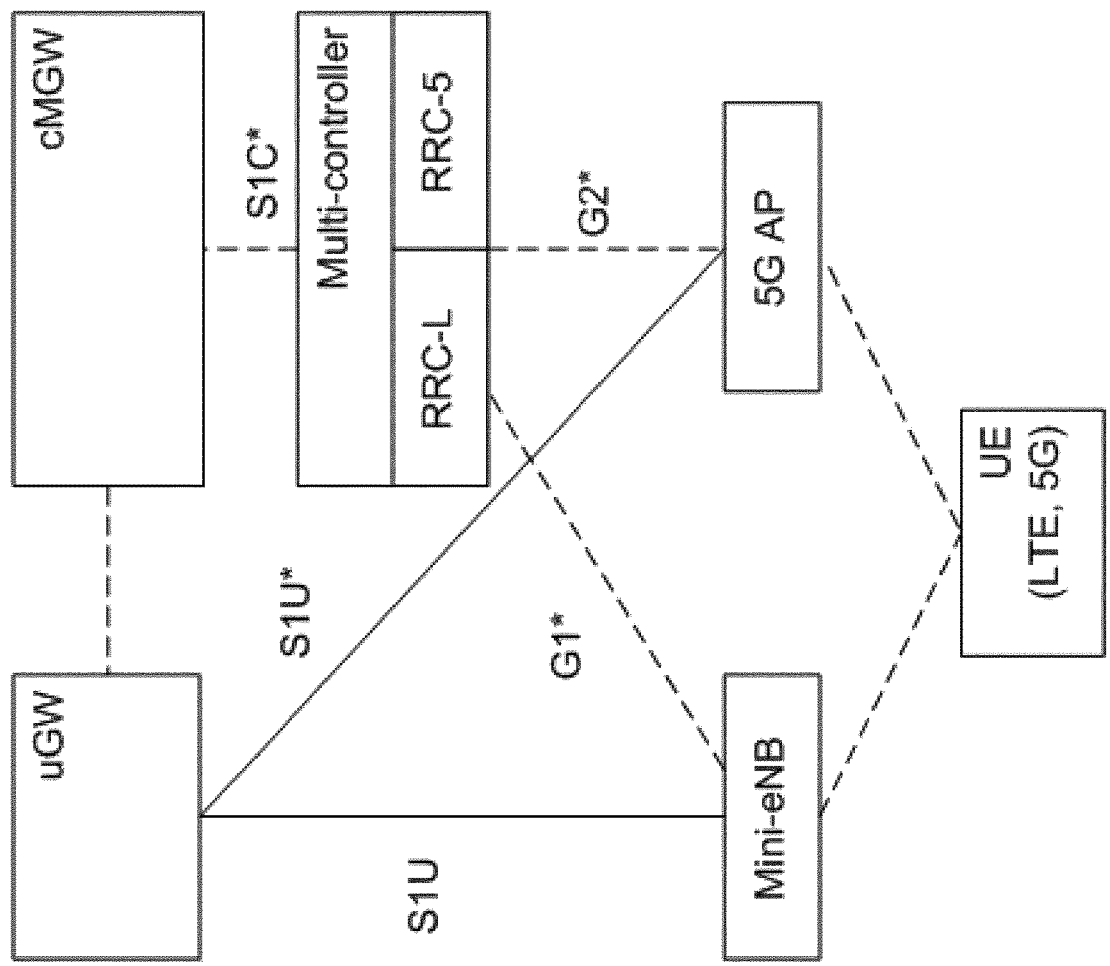

FIG. 4 schematically illustrates an inter RAT architecture for multi RAT interworking (LTE-5G) applied to a scenario with LTE and 5G mobile communication system, according to exemplary embodiments of the present invention.

In particular, an interworking architecture with common core and multi controller (dual control plane connectivity option (two RRC connections), common AS context, common NAS context) is shown.

The principles behind this architecture are as follows.
UE supports LTE and 5G
5G and LTE have their own radio resource control (RRC) connections (two independent control plane stacks),
5G and LTE could have independent-signaling connections or share the same connection.

5G+LTE-capable UE can perform measurements periodically, based on indication from network, or when it detects the need for 5G services;
Mini eNB is an eNB without RRC functions
the RRC protocol of the LTE RAT has been moved to a multi controller (MC) logical entity;
Common CN for LTE and 5G
cMGW maintains Non-Access Stratum (NAS) signaling connections, context for both LTE and 5G,
Multi controller maintains RRC connections, context for both LTE and 5G
common AS context in multi controller;
user plane for 5G and LTE can go via uGW,
user plane for LTE can also go via S-GW, P-GW,
cMGW/uGW terminate(s) legacy S1-C/U and new S1-C/U*, respectively, and
multi controller is a logical entity which can be located in the network based on the deployment requirements.

Exemplary embodiments of the present invention will be explained utilizing this proposed architecture and the corresponding principles. However, the proposed architecture as well as the corresponding principles may be modified as long as compliant with the features described herein.

As mentioned above, the present invention proposes a solution for optimizing intra- and inter-RAT mobility with reduced signaling during mobility events, minimized service disruption during handovers, wherein embodiments are applicable for both intra-small cell and small cell-to-macro cell mobility.

According to exemplary embodiments of the present invention, the RRC connections of all RATs and radio interfaces of 5G are terminated in the proposed multi controller.

Further, according to exemplary embodiments of the present invention, a single UE AS context is established in the multi controller for all the connected RATs (or radio interfaces) of a UE involved in multi connectivity.

It is noted that cmW and mmW are belonging to the same RAT, 5G, and hence are called radio interfaces of the same RAT.

In addition, the multi controller logical entity is located/arranged much higher in hierarchy than the access point nodes, i.e., multiple access points or base stations are controlled/managed by the same multi controller. This hierarchy is dependent on the deployment model of the network.

In doing so, the number of mobility events is limited to that of a multi controller instead of to that of each of controlled/managed access points.

Figure 5:
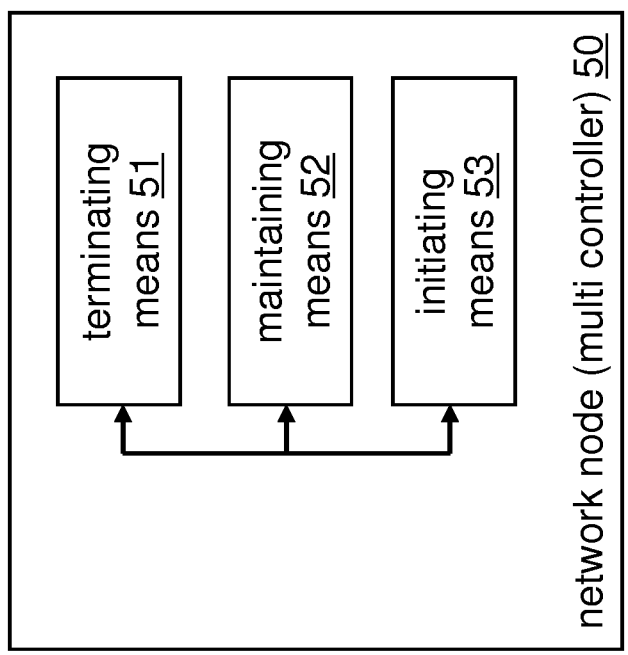
FIG. 5 is a block diagram illustrating an apparatus according to exemplary embodiments of the present invention.

FIG. 5 is a block diagram illustrating an apparatus according to exemplary embodiments of the present invention. The apparatus may be a network node 50 (e.g. the above proposed multi controller) for providing, in a control plane for a terminal, connection management for at least a first network access entity and a second network access entity, wherein said at least first network access entity and second network access entity providing radio access for user plane data transfer for said terminal, wherein said terminal being capable of having radio access to said at least first network access entity and second network access entity for user plane data transfer, the network node 50 comprising a terminating means 51, a maintaining means 52, and an initiating means 53.

In an embodiment at least some of the functionalities of the apparatus shown in FIG. 5 may be shared between two physically separate devices forming one operational entity. Therefore, the apparatus may be seen to depict the operational entity comprising one or more physically separate devices for executing at least some of the described processes.

Figure 6:
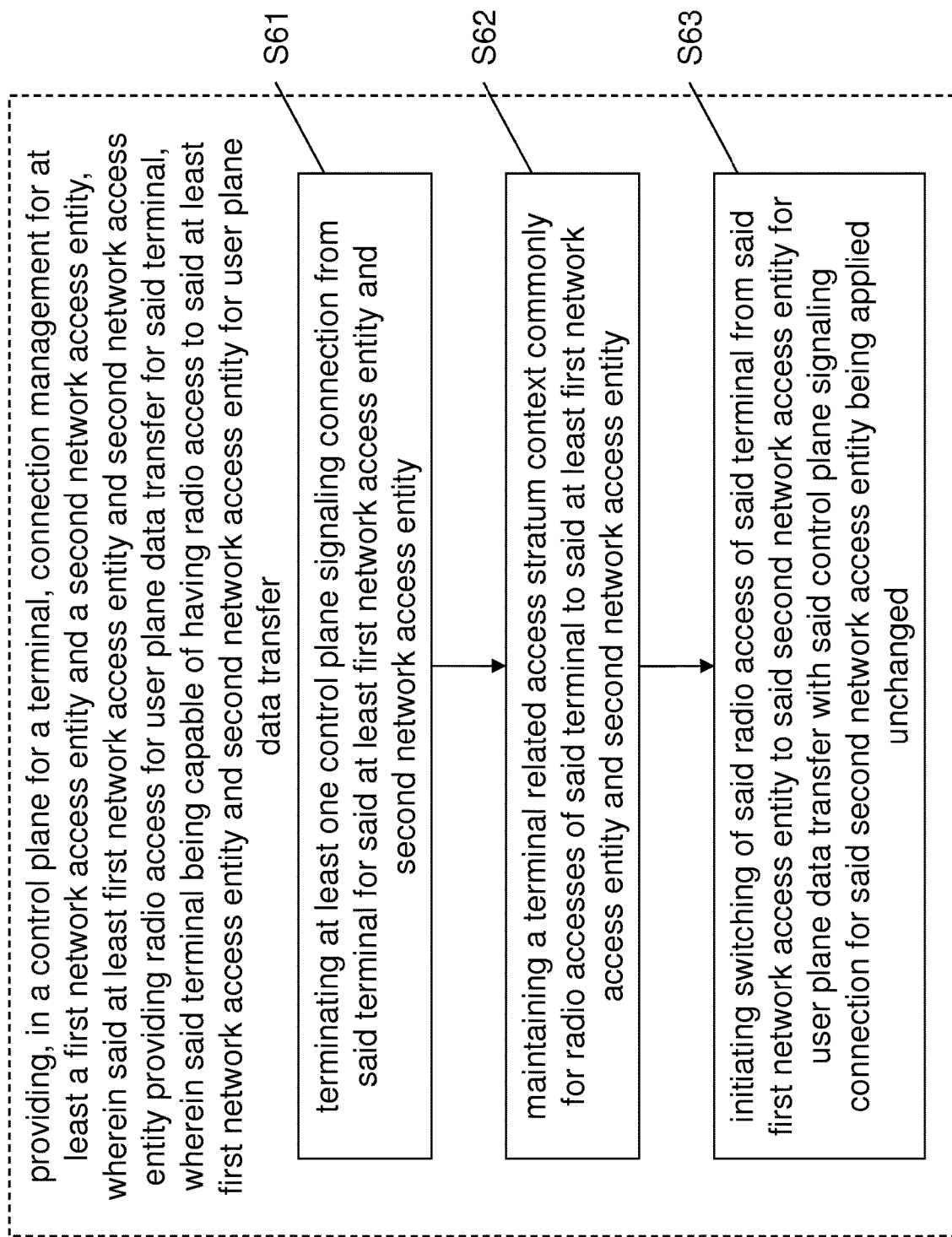
FIG. 6 is a schematic diagram of a procedure according to exemplary embodiments of the present invention.

The terminating means 51 may terminate at least one control plane signaling connection (e.g. RRC connection) from said terminal for said at least first network access entity and second network access entity. The maintaining means 52 may maintain a terminal related access stratum context commonly for radio accesses of said terminal to said at least first network access entity and second network access entity. The initiating means 53 may initiate switching of said radio access of said terminal from said first network access entity to said second network access entity for user plane data transfer with said control plane signaling connection for said second network access entity being applied unchanged. FIG. 6 is a schematic diagram of a procedure according to exemplary embodiments of the present invention. The apparatus according to FIG. 5 may perform the method of FIG. 6 but is not limited to this method. The method of FIG. 6 may be performed by the apparatus of FIG. 5 but is not limited to being performed by this apparatus.

As shown in FIG. 6, a procedure according to exemplary embodiments of the present invention comprises an operation of terminating (S61) at least one control plane signaling connection from the terminal for said at least first network access entity and second network access entity, an operation of maintaining (S62) a terminal related access stratum context commonly for radio accesses of said terminal to said at least first network access entity and second network access entity, and an operation of initiating (S63) switching of said radio access of said terminal from said first network access entity to said second network access entity for user plane data transfer with said control plane signaling connection for said second network access entity being applied unchanged, generally to provide, in a control plane for the terminal, connection management for at least the first network access entity and the second network access entity, wherein the at least first network access entity and second network access entity providing radio access for user plane data transfer for said terminal, wherein said terminal being capable of having radio access to the at least first network access entity and second network access entity for user plane data transfer.

Figure 7:
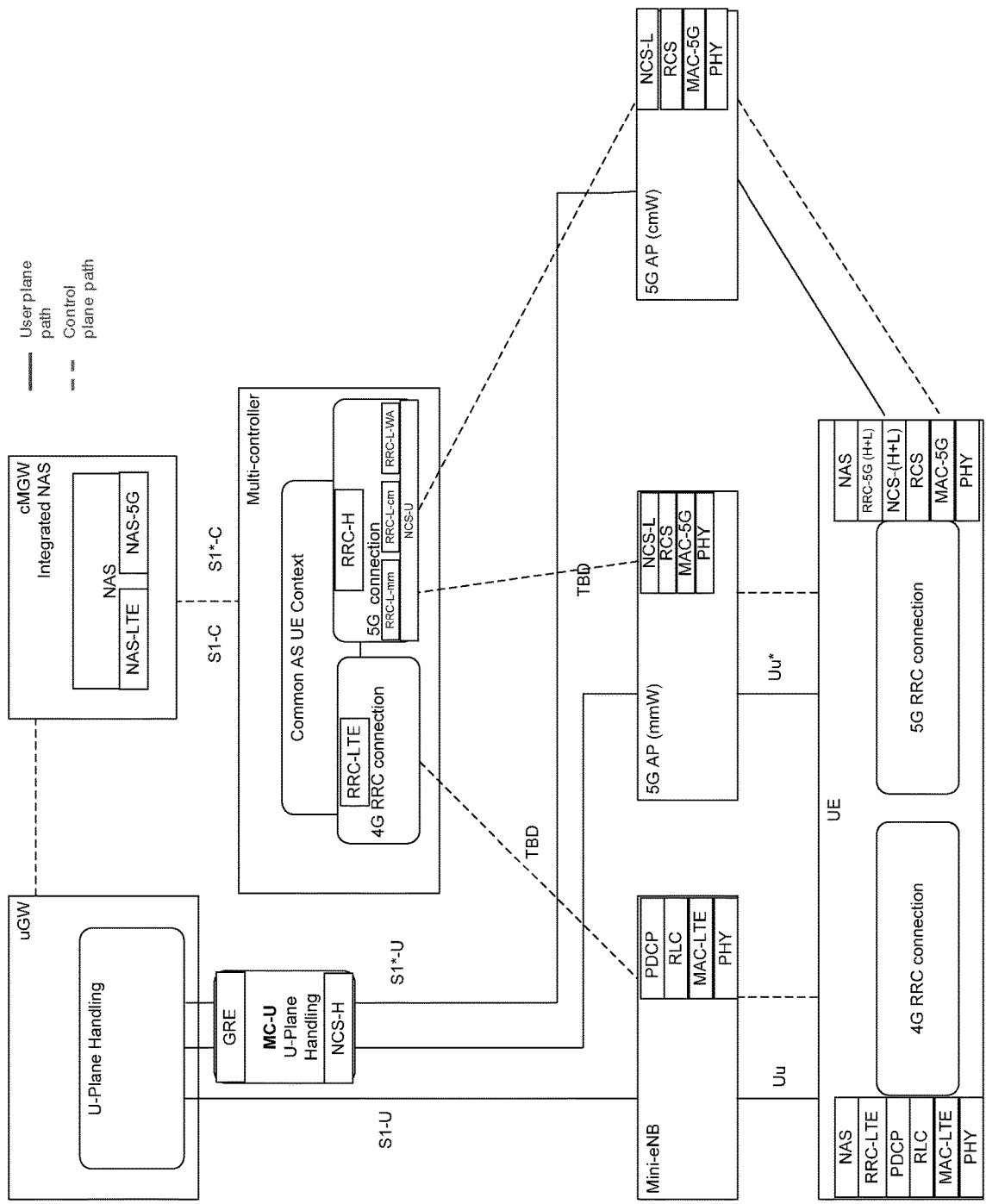
FIG. 7 is a schematic diagram illustrating details of a multi connectivity architecture according to exemplary embodiments of the present invention.

FIG. 7 is a schematic diagram illustrating details of a multi connectivity architecture according to exemplary embodiments of the present invention. In particular, specifics of an exemplary realization according to embodiments of the present invention of the proposed inter RAT architecture for multi RAT interworking shown in FIG. 4 are illustrated.

As is derivable from that FIG. 7, control plane paths are illustrated by dotted lines, while user plane paths are illustrated by solid lines.

A UE illustrated in FIG. 7 is able to connect to a Mini-eNB of a LTE network, the user plane services for which is provided by an uGW. Further, the UE illustrated in that Figure is able to connect to a 5G access point working at millimeter waves (mmW), the user plane of which is provided by the same or different uGW, and to connect to a 5G access point working at centimeter waves (cmW), the user plane of which is provided by the same or different uGW. The control plane for all three connections is provided by a cMGW via the multi controller. Here, the multi controller comprises a dedicated module for the LTE connection terminating the RRC of the LTE connection (RRC-LTE) as well as a dedicated module for the 5G connections terminating the RRC of the 5G connections (RRC-H, RRC-L-mm, RRC-L-cm, RRC-L-WA). Acronyms used in the Figure and in particular those not being known from LTE specifications are listed at the end of this specification. It is self-evident that the illustrated scenario is just an example for explanation purposes, and more, less, and/or other connections are possible.

Figure 8:
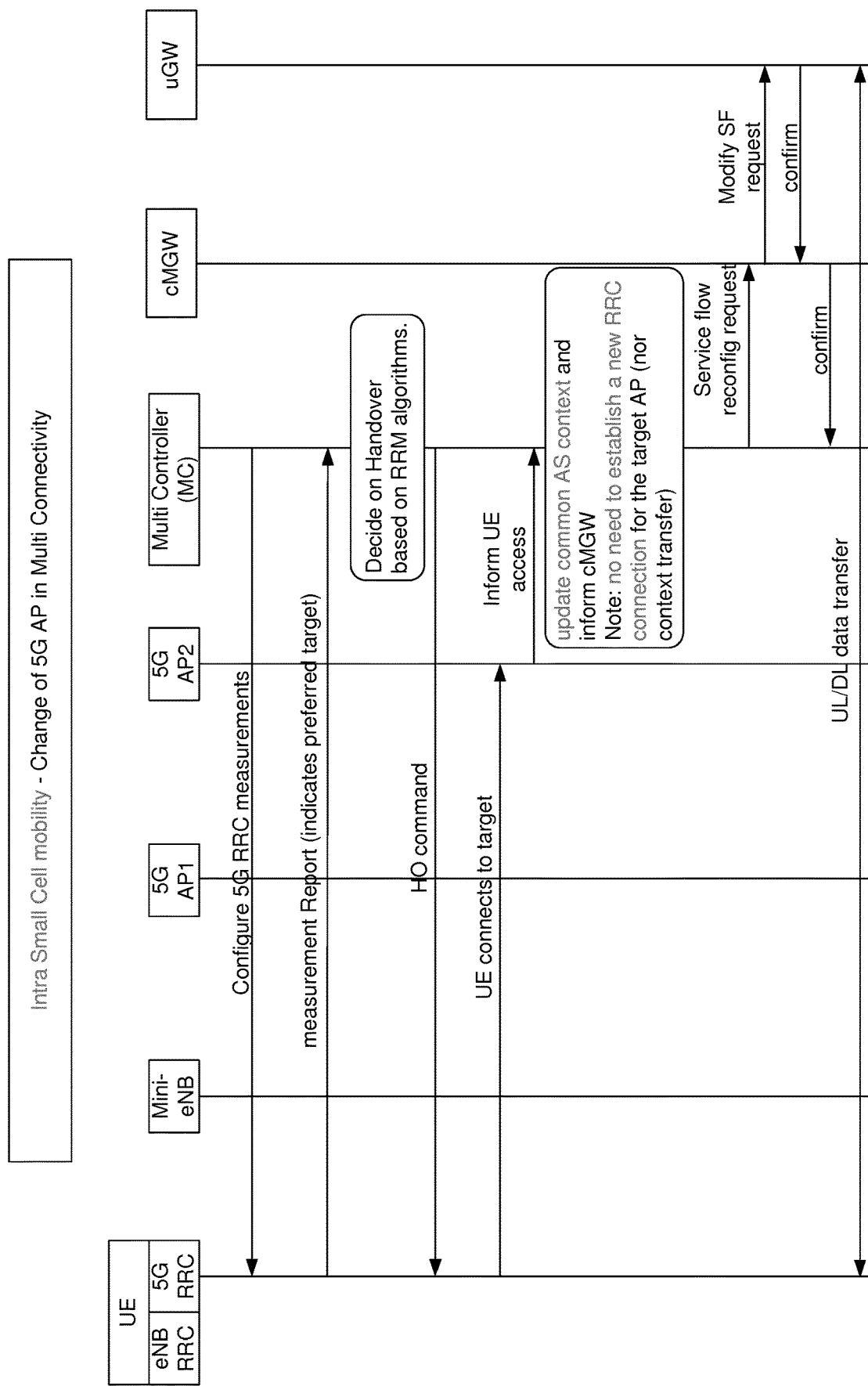
FIG. 8 shows a schematic diagram of signaling sequences according to exemplary embodiments of the present invention.

FIG. 8 shows a schematic diagram of signaling sequences according to exemplary embodiments of the present invention. In particular, FIG. 8 illustrates an implementation of intra-5G small cell mobility according to exemplary embodiments of the present invention. Namely, a 5G AP is changed in multi connectivity in the context of intra small cell mobility.

In brief, once the multi controller has knowledge of a preferred target AP of a terminal (which differs from the current AP), the multi controller decides to handover the connection of the terminal, and initiates such handover by causing a handover command to the UE. Once the UE connected to the target 5G AP (here: 5G AP2) and the target 5G AP informed the multi controller thereof, the multi controller updates the common AS context and informs the cMGW on the handover. Here, the updating includes updating tunnel end points of the target 5G AP and further updating new configuration info, if changed. Since the multi controller maintains the respective RRC connection(s), there is no need to establish a new RRC connection for the target AP (unless there is a change in the multi controller itself, in which case, there will be a normal handover over X2*). In addition, also a context transfer is not necessary.

Returning to FIG. 6, in other words, when said at least first network access entity and second network access entity correspond to at least a first radio interface and a second radio interface of the same radio access technology, respectively (intra-RAT), according to a variation of the method shown in FIG. 6, exemplary additional operations and exemplary details of the initiating operation are given, which are inherently independent from each other as such.

According to such variation, an exemplary method according to exemplary embodiments of the present invention may further comprise an operation of receiving a measurement report indicating said second network access entity as preferred target, and such exemplary initiating operation according to exemplary embodiments of the present invention may comprise an operation of transmitting a handover command to said terminal, said handover command instructing switching of said radio access to said second network access entity, and an operation of receiving, from said second network access entity, information indicative of confirmation and configuration details about said radio access of the terminal to said second network access entity.

According to a further variation of the method shown in FIG. 6, exemplary details of the initiating operation are given, which are inherently independent from each other as such. Such exemplary initiating operation according to exemplary embodiments of the present invention may comprise an operation of transmitting a service flow reconfiguration request indicative of an intended switching of said radio access of said terminal to said second network access entity, and an operation of receiving a confirmation of said intended switching of said radio access of said terminal to said second network access entity.

According to a further variation of the method shown in FIG. 6, exemplary additional operations are given, which are inherently independent from each other as such. According to such variation, an exemplary method according to exemplary embodiments of the present invention may comprise an operation of updating said terminal related access stratum context.

According to a further variation of the method shown in FIG. 6, one control plane signaling connection from said terminal is terminated commonly for the at least first network access entity and second network access entity, or alternatively, one control plane signaling connection from said terminal is terminated per each of the at least first network access entity and second network access entity.

In other words, according to one option of exemplary embodiments of the present invention, (only) one RRC connection is maintained for all the radio interfaces of 5G (e.g. mm wave, cm wave, and wide area (WA)) in relation to the terminal. However, according to another option of exemplary embodiments of the present invention, one (dedicated) connection per each radio interface of 5G (e.g. mm wave, cm wave, and wide area) is maintained in relation to the terminal. As an example of the second option, if the terminal would maintain a mm wave radio interface and a cm wave radio interface, two RRC connections (one for the mm wave radio interface and one for the cm wave radio interface) would be maintained/terminated at the involved multi controller.

While traditional intra RAT handover (HO) involved setting up of a new RRC connection in the target access point and transfer of the UE AS context to the target over X2 interface (if one existed), according to exemplary embodiments of the present the invention, both of these steps can be avoided. It is not necessary to setup the RRC connection freshly, as long as the target access point is also served by the same multi controller. Further, the AS context is not to be transferred to the target AP since both the APs share the same AS context.

According to the exemplary embodiments of the present invention, RRC connection setup and context transfer are required only when the UE changes the multi controller, depending on the hierarchy of the multi controller in the AS network.

Figure 9:
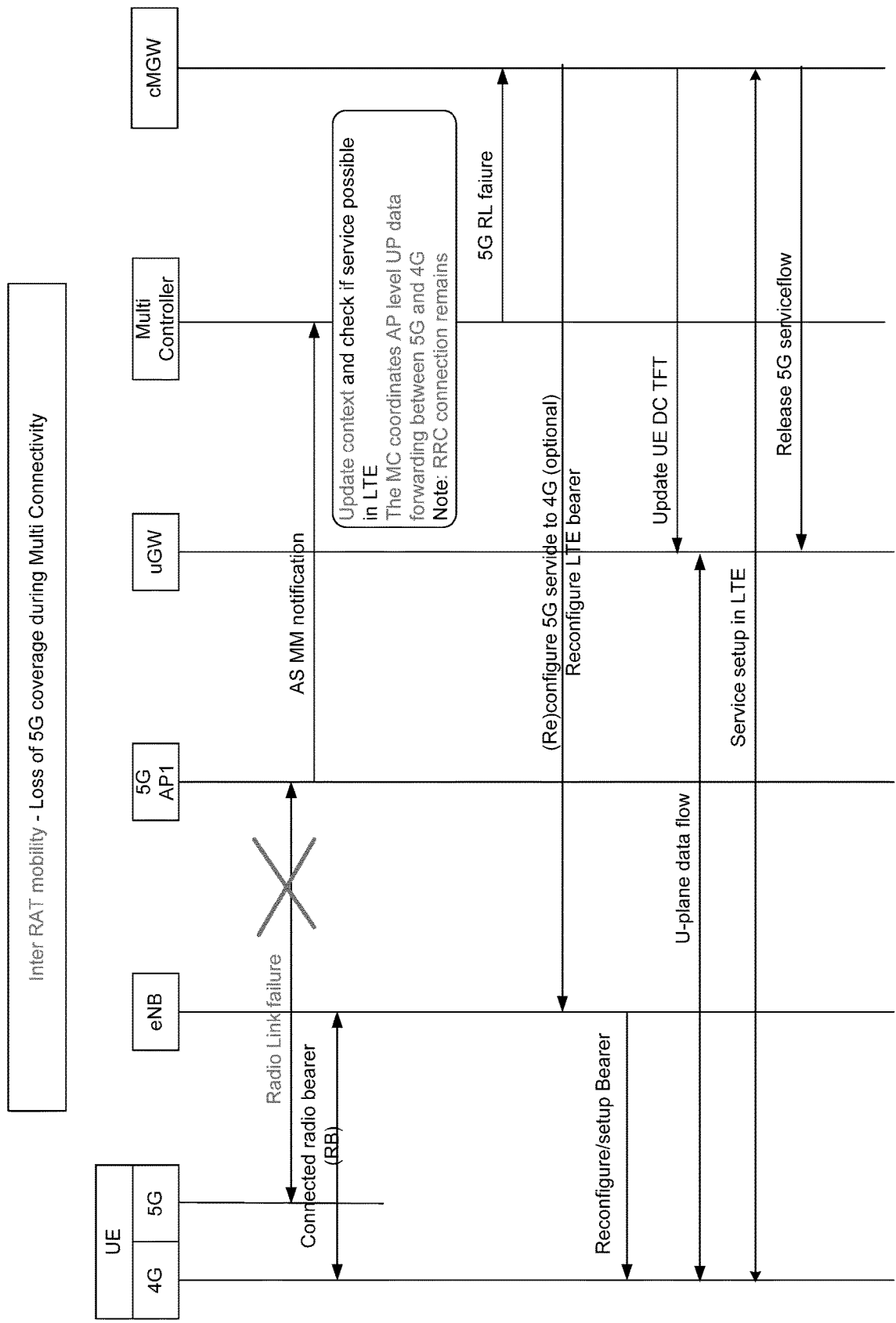
FIG. 9 shows a schematic diagram of signaling sequences according to exemplary embodiments of the present invention.

FIG. 9 shows a schematic diagram of signaling sequences according to exemplary embodiments of the present invention. In particular, FIG. 9 illustrates an implementation of inter-RAT mobility (e.g. from 5G to LTE) according to exemplary embodiments of the present invention. Namely, a loss of coverage or traffic steering during multi connectivity is handled.

In brief, once the multi controller has knowledge of a radio link failure (RLF) of a terminal to a 5G AP (5G AP1), the multi controller updates the (common) AS context and checks whether the service performed by means of the 5G AP is possible in LTE (by the corresponding eNB). Here, the updating includes removal of the tunnel end point on the 5G side and stopping of the data forwarding. Further, the multi controller coordinates AP level UP data forwarding between 5G and 4G (LTE), which means that with the same numbering scheme in both RATs, the multi controller can co-ordinate the (unsuccessfully) sent packets on 5G, which otherwise has to be re-transmitted by the CN. This is possible if the network convergence layer (NCS-H) protocol (5G's packet data control plane (PDCP)) is induced in LTE or PDCP numbering is followed in 5G. That is, in more general terms, the multi controller can coordinate forwarding of data intended for transmission utilizing the 5G AP to the LIE AP (eNB). Since the multi controller maintains the respective RRC connection(s), there is no need to establish a new RRC connection for the target eNB. In addition, also a context transfer is not necessary.

Returning to FIG. 6, in other words, when said at least first network access entity and second network access entity correspond to at least a first radio access technology and a second radio access technology, respectively (inter-RAT), with terminating one control plane signaling connection from said terminal per each of the at least first network access entity and second network access entity, according to a variation of the method shown in FIG. 6, exemplary additional operations and exemplary details of the initiating operation are given, which are inherently independent from each other as such.

According to such variation, an exemplary method according to exemplary embodiments of the present invention may further comprise an operation of perceiving a radio link failure with respect to said radio access of said terminal with said first network access entity, and such exemplary initiating operation according to exemplary embodiments of the present invention may comprise an operation of transmitting a message indicative of said radio link failure with respect to said radio access of said terminal with said first network access entity.

According to a further variation of the method shown in FIG. 6, exemplary additional operations are given, which are inherently independent from each other as such. According to such variation, an exemplary method according to exemplary embodiments of the present invention may comprise an operation of updating said terminal related access stratum context.

According to a still further variation of the method shown in FIG. 6, exemplary additional operations are given, which are inherently independent from each other as such. According to such variation, an exemplary method according to exemplary embodiments of the present invention may comprise an operation of coordinating forwarding of data intended for transmission utilizing said radio access of said terminal with said first network access entity to said radio access of said terminal with said second network access entity A traditional inter RAT handover would comprise of the following signaling after receiving the measurement reports at the base station, namely, preparation of the target, and handover to the target.

This handover procedure would always use the core network route to communicate to the other RAT. This would involve a lot of signaling.

To the contrary, according to exemplary embodiments of the present invention, this unnecessary signaling is avoided, since a common AS context for both RATs is present at the multi controller.

Accordingly, data forwarding between 5G AP and 4G eNB can be enabled, as e.g. in intra-4G HOs. This data forwarding may be coordinated by the multi controller in a timely manner. This is possible by having the same packet numbering scheme in both RATs i.e introducing 5G packet numbering scheme for LTE; alternatively LTE numbering scheme for LTE.

Further, since in the traditional way the only common node between the RATs was the CN even the AS signaling had to go through NAS elements.

To the contrary, according to exemplary embodiments of the present invention, the RRC connections of both involved RATs are terminated at the proposed multi controller and hence the AS signaling can be limited to take place in the AS only.

While according to the traditional way the length of the signaling procedure results in that big service disruption or user plane break occurred during mobility events, according to exemplary embodiments of the present invention, the reduction of the signaling also results in minimizing the service disruption and reducing the processing overhead on network nodes.

The above-described procedures and functions may be implemented by respective functional elements, processors, or the like, as described below.

In the foregoing exemplary description of the network node/entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity/node (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 10:
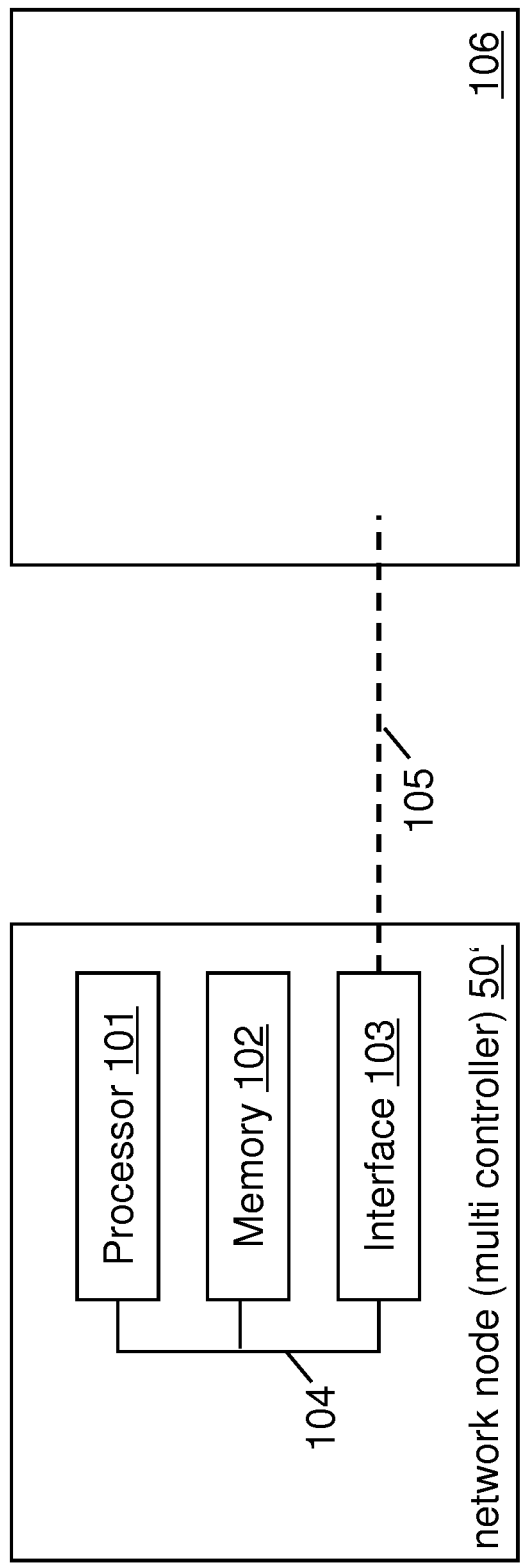
FIG. 10 is a block diagram alternatively illustrating apparatuses according to exemplary embodiments of the present invention.

In FIG. 10, an alternative illustration of apparatuses according to exemplary embodiments of the present invention is depicted. As indicated in FIG. 10, according to exemplary embodiments of the present invention, the apparatus (network node) 50' (corresponding to the network node 50) comprises a processor 101, a memory 102 and an interface 103, which are connected by a bus 104 or the like, and the apparatus 50' may be connected to another apparatus 106 via link 105.

The processor 101 and/or the interface 103 may also include a modem or the like to facilitate communication over a (hardwire or wireless) link, respectively. The interface 103 may include a suitable transceiver coupled to one or more antennas or communication means for (hardwire or wireless) communications with the linked or connected device(s), respectively. The interface 103 is generally configured to communicate with at least one other apparatus, i.e. the interface thereof.

The memory 102 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 50 comprises at least one processor 101, at least one memory 102 including computer program code, and at least one interface 103 configured for communication with at least another apparatus. The processor (i.e. the at least one processor 101, with the at least one memory 102 and the computer program code) is configured to perform terminating at least one control plane signaling connection (RRC connection) from said terminal for said at least first network access entity and second network access entity, (thus the apparatus comprising corresponding means for terminating), to perform maintaining a terminal related access stratum context commonly for the radio accesses of said terminal to said at least first network access entity and second network access entity (thus the apparatus comprising corresponding means for maintaining), and to perform initiating switching of said radio access of said terminal from said first network access entity to said second network access entity for user plane data transfer with said control plane signaling connection for said second network access entity being applied unchanged (thus the apparatus comprising corresponding means for initiating).

For further details regarding the operability/functionality of the individual apparatuses, reference is made to the above description in connection with any one of FIGS. 4 to 9, respectively.

Any of the operations of transmitting and receiving referred to in the foregoing can be performed by a transmitter and a receiver respectively and any entities discussed herein performing transmitting or receiving may be provided with, for example may contain, such a transmitter or receiver in the form of hardware for this purpose. This also applies to any of communication over a (hardwire or wireless) link discussed herein.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for improvements in small cell mobility with dual/multi connectivity. Such measures exemplarily comprise terminating at least one control plane signaling connection from said terminal for said at least first network access entity and second network access entity, maintaining a terminal related access stratum context commonly for radio accesses of said terminal to said at least first network access entity and second network access entity, and initiating switching of said radio access of said terminal from said first network access entity to said second network access entity for user plane data transfer with said control plane signaling connection for said second network access entity being applied unchanged, thereby providing, in a control plane for a terminal, connection management for at least a first network access entity and a second network access entity, wherein said at least first network access entity and second network access entity providing radio access for user plane data transfer for said terminal, wherein said terminal being capable of having radio access to said at least first network access entity and second network access entity for user plane data transfer.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP $3^{rd}$ Generation Partnership Project
AAA Authentication, Authorization and Accounting
AP Access Point
APN Access Point Name
AS Access Stratum
ASIx application service instance/interface x
BSC base station controller
cMGW control plane mobile gateway
cmW centimeter wave
CN Core Network
c-plane control plane
CS circuit switched
cSE control-plane service edge
DC Dual Connectivity
eNB evolved NodeB
EPS Evolved Packet System
ETH UNI Ethernet user network interface
GERAN GSM Enhanced Radio Access Network
GPRS General Packet Radio System
GSM Global System for Mobile Communication
GW gateway
HLR home location register
HO handover
HSS home subscription server
LTE Long Term Evolution
IP UNI IP user network interface
iRAT inter RAT
MC multi controller
MME Mobility Management Entity
mmW millimeter wave
NAS Non-Access Stratum
NCS-H network convergence layer
NT network terminal
PDCP packet data control plane
P-GW PDN-GW, Packet Data Network Gateway
RAN radio access network
RAT radio access technology
RLF radio link failure
RNC radio network controller
RRC radio resource control
S-GW Serving Gateway
UE user equipment
uGW user plane gateway
u-plane user plane
uSE user-plane service edge
UTRAN Universal Terrestrial Radio Access Network
V2X Vehicle-To-X, vehicular to any WCDMA wideband code division multiple access

The invention claimed is:

1. A method comprising:
providing, in a control plane for a terminal, connection management for at least a first network access entity and a second network access entity, wherein said at least first network access entity and second network access entity providing radio access for user plane data transfer for said terminal, wherein said terminal being capable of having radio access to said at least first network access entity and second network access entity for user plane data transfer,
terminating at least one control plane signaling connection from said terminal for said at least first network access entity and second network access entity,
maintaining an access stratum context related to the terminal, maintained commonly for radio accesses of said terminal to said at least first network access entity and second network access entity, the access stratum context being a common terminal context for radio access technologies of different types involved in providing multi-connectivity services for the terminal, wherein the access stratum context is responsible for transporting data and managing resources, and
initiating switching of said radio access of said terminal from said first network access entity to said second network access entity for user plane data transfer with said control plane signaling connection for said second network access entity being applied unchanged.

2. The method according to claim 1, wherein said at least first network access entity and second network access entity correspond to at least a first radio interface and a second radio interface of the same radio access technology, respectively,
the method further comprising
receiving a measurement report indicating said second network access entity as preferred target, and
in relation to said initiating, the method further comprises transmitting a handover command to said terminal, said handover command instructing switching of said radio access to said second network access entity, and
receiving, from said second network access entity, information indicative of confirmation and configuration details about said radio access of the terminal to said second network access entity.

3. The method according to claim 2, wherein
in relation to said initiating, the method further comprises transmitting a service flow reconfiguration request indicative of an intended switching of said radio access of said terminal to said second network access entity, and
receiving a confirmation of said intended switching of said radio access of said terminal to said second network access entity.

4. The method according to claim 2, further comprising updating the access stratum context related to the terminal.

5. The method according to claim 2, wherein
one control plane signaling connection from said terminal is terminated commonly for the at least first network access entity and second network access entity, or
one control plane signaling connection from said terminal is terminated per each of the at least first network access entity and second network access entity.

6. The method according to claim 1, wherein said at least first network access entity and second network access entity correspond to at least a first radio access technology and a second radio access technology, respectively, with terminating one control plane signaling connection from said terminal per each of the at least first network access entity and second network access entity,
the method further comprising
perceiving a radio link failure with respect to said radio access of said terminal with said first network access entity, and
in relation to said initiating, the method further comprises transmitting a message indicative of said radio link failure with respect to said radio access of said terminal with said first network access entity.

7. The method according to claim 6, further comprising updating the access stratum context related to the terminal.

8. The method according to claim 6, further comprising coordinating forwarding of data intended for transmission utilizing said radio access of said terminal with said first network access entity to said radio access of said terminal with said second network access entity.

9. The method according to claim 1,
wherein said control plane signaling connection is a radio resource control connection.

10. A computer program product embodied on a non-transitory computer-readable medium, said product comprising computer-executable computer program code which, when the program is run on a computer, is configured to cause the computer to carry out the method according to claim 1.

11. An apparatus comprising:
at least one processor,
at least one memory including computer program code, and
at least one interface configured for communication with at least another apparatus,
the at least one processor, with the at least one memory and the computer program code, being configured to cause the apparatus to perform
providing, in a control plane for a terminal, connection management for at least a first network access entity and a second network access entity, wherein said at least first network access entity and second network access entity providing radio access for user plane data transfer for said terminal, wherein said terminal being capable of having radio access to said at least first network access entity and second network access entity for user plane data transfer,
terminating at least one control plane signaling connection from said terminal for said at least first network access entity and second network access entity,
maintaining an access stratum context related to the terminal, maintained commonly for radio accesses of said terminal to said at least first network access entity and second network access entity, the access stratum context being a common terminal context for radio access technologies of different types involved in providing multi-connectivity services for the terminal, wherein the access stratum context is responsible for transporting data and managing resources, and
initiating switching of said radio access of said terminal from said first network access entity to said second network access entity for user plane data transfer with said control plane signaling connection for said second network access entity being applied unchanged.

12. The apparatus according to claim 11, wherein said at least first network access entity and second network access entity correspond to at least a first radio interface and a second radio interface of the same radio access technology, respectively, and wherein the at least one processor, with the at least one memory and the computer program code, being configured to cause the apparatus to perform:

receiving a measurement report indicating said second network access entity as preferred target, transmitting a handover command to said terminal, said handover command instructing switching of said radio access to said second network access entity, and receiving, from said second network access entity, information indicative of confirmation and configuration details about said radio access of the terminal to said second network access entity.

13. The apparatus according to claim 12, wherein the at least one processor, with the at least one memory and the computer program code, being configured to cause the apparatus to perform:

transmitting a service flow reconfiguration request indicative of an intended switching of said radio access of said terminal to said second network access entity, and receiving a confirmation of said intended switching of said radio access of said terminal to said second network access entity.

14. The apparatus according to claim 12, wherein the at least one processor, with the at least one memory and the computer program code, being configured to cause the apparatus to perform:

updating the access stratum context related to the terminal.

15. The apparatus according to claim 12, wherein one control plane signaling connection from said terminal is terminated commonly for the at least first network access entity and second network access entity, or one control plane signaling connection from said terminal is terminated per each of the at least first network access entity and second network access entity.

16. The apparatus according to claim 11, wherein said at least first network access entity and second network access entity correspond to at least a first radio access technology and a second radio access technology, respectively, with terminating one control plane signaling connection from said terminal per each of the at least first network access entity and second network access entity, and wherein the at least one processor, with the at least one memory and the computer program code, being configured to cause the apparatus to perform:

perceiving a radio link failure with respect to said radio access of said terminal with said first network access entity, and transmitting a message indicative of said radio link failure with respect to said radio access of said terminal with said first network access entity.

17. The apparatus according to claim 16, wherein the at least one processor, with the at least one memory and the computer program code, being configured to cause the apparatus to perform:

updating the access stratum context related to the terminal.

18. The apparatus according to claim 16, wherein the at least one processor, with the at least one memory and the computer program code, being configured to cause the apparatus to perform:

coordinating forwarding of data intended for transmission utilizing said radio access of said terminal with said first network access entity to said radio access of said terminal with said second network access entity.

19. The apparatus according to claim 11, wherein the apparatus is operable as or at a network node of a cellular system, or the apparatus is operable in at least one of a LTE and a LTE-A cellular system, or said control plane signaling connection is a radio resource control connection.

\* \* \* \* \*